(12) United States Patent
Ahn et al.

(10) Patent No.: US 11,326,050 B2
(45) Date of Patent: May 10, 2022

(54) METHOD OF PREPARING GRAFT COPOLYMER, GRAFT COPOLYMER, AND THERMOPLASTIC RESIN MOLDED ARTICLE INCLUDING GRAFT COPOLYMER

(71) Applicant: LG CHEM, LTD., Seoul (KR)

(72) Inventors: Bong Keun Ahn, Daejeon (KR); Min Jung Kim, Daejeon (KR); Jang Won Park, Daejeon (KR); Yong Yeon Hwang, Daejeon (KR); Wang Rae Joe, Daejeon (KR); Ji Yoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 16/954,995

(22) PCT Filed: Aug. 5, 2019

(86) PCT No.: PCT/KR2019/009733
§ 371 (c)(1),
(2) Date: Jun. 17, 2020

(87) PCT Pub. No.: WO2020/032505
PCT Pub. Date: Feb. 13, 2020

(65) Prior Publication Data
US 2021/0002472 A1    Jan. 7, 2021

(30) Foreign Application Priority Data
Aug. 8, 2018  (KR) .......................... 10-2018-0092433

(51) Int. Cl.
| C08L 51/00 | (2006.01) |
| C08F 220/18 | (2006.01) |
| C08F 212/08 | (2006.01) |
| C08F 220/14 | (2006.01) |
| C08F 220/44 | (2006.01) |
| C08F 236/20 | (2006.01) |
| C08F 257/02 | (2006.01) |
| C08F 265/06 | (2006.01) |
| C08J 3/12 | (2006.01) |

(52) U.S. Cl.
CPC .......... *C08L 51/003* (2013.01); *C08F 212/08* (2013.01); *C08F 220/14* (2013.01); *C08F 220/1802* (2020.02); *C08F 220/1804* (2020.02); *C08F 220/44* (2013.01); *C08F 236/20* (2013.01); *C08F 257/02* (2013.01); *C08F 265/06* (2013.01); *C08J 3/12* (2013.01); *C08F 2800/20* (2013.01); *C08L 2207/53* (2013.01)

(58) Field of Classification Search
CPC ........... C08L 51/04; C08L 33/10; C08L 25/12
See application file for complete search history.

(56) References Cited

U.S. PATENT DOCUMENTS

| 2003/0236350 | A1 | 12/2003 | Berzinis et al. |
| 2010/0130685 | A1 | 5/2010 | Weber et al. |
| 2013/0345362 | A1 | 12/2013 | Maeda et al. |
| 2015/0011709 | A1* | 1/2015 | Ahn ...................... C08F 285/00 525/230 |
| 2017/0002189 | A1* | 1/2017 | Maeda ................... C08L 51/04 |
| 2018/0355161 | A1 | 12/2018 | Ahn et al. |

FOREIGN PATENT DOCUMENTS

| CN | 106832106 A | 6/2017 |
| JP | H0525227 A | 2/1993 |
| JP | 2001031830 A | 2/2001 |
| JP | 2003181985 A | 7/2003 |
| JP | 2005530899 A | 10/2005 |
| JP | 2015196715 A | 11/2015 |
| KR | 10-2007-0029667 A | 3/2007 |
| KR | 10-2013-0066114 A | 6/2013 |
| KR | 10-2013-0090732 A | 8/2013 |
| KR | 10-2015-0026404 A | 3/2015 |
| KR | 10-1553886 | 9/2015 |
| KR | 10-2016-0081497 A | 7/2016 |
| KR | 10-2017-0090766 A | 8/2017 |
| KR | 10-2018-0047949 A | 5/2018 |
| WO | WO2012133190 A1 | 10/2012 |
| WO | WO2020032505 A | 2/2020 |

OTHER PUBLICATIONS

European Search Report and Written Opinion dated Mar. 9, 2021 for related European Patent Application No. 19846947.0.

* cited by examiner

*Primary Examiner* — Mark S Kaucher

(57) ABSTRACT

Provided are a method of preparing a graft copolymer, a graft copolymer, and a thermoplastic resin molded article including the graft copolymer, the method including: 1) preparing a seed by adding one or more selected from the group consisting of an alkyl (meth)acrylate-based monomer, an aromatic vinyl-based monomer, and a vinyl cyan-based monomer and performing polymerization; 2) in the presence of the seed, preparing a core by adding an alkyl (meth) acrylate-based monomer and performing polymerization; and 3) in the presence of the core, preparing a shell by adding an aromatic vinyl-based monomer and a vinyl cyan-based monomer and performing polymerization, wherein the method further includes adding an alkyl acrylate-based polymer. When the alkyl acrylate-based polymer is included in a graft copolymer, a graft copolymer and a thermoplastic resin molded article excellent in weather resistance, fluidity, mechanical properties, and appearance quality can be provided.

12 Claims, No Drawings

METHOD OF PREPARING GRAFT COPOLYMER, GRAFT COPOLYMER, AND THERMOPLASTIC RESIN MOLDED ARTICLE INCLUDING GRAFT COPOLYMER

CROSS-REFERENCE TO RELATED APPLICATION

The present application is a National Phase Entry into the U.S. of PCT/KR2019/009733 filed Aug. 5, 2019, which claims priority to and the benefit of Korean Patent Application No. 10-2018-0092433, filed on Aug. 8, 2018, the disclosure of which is incorporated herein by reference in its entirety.

TECHNICAL FIELD

The present invention relates to a method of preparing a graft copolymer, a graft copolymer, and a thermoplastic resin molded article including the graft copolymer, and more specifically, to a method of preparing a graft copolymer which further includes adding an alkyl acrylate-based polymer, a graft copolymer, and a thermoplastic resin molded article including the graft copolymer.

BACKGROUND ART

Recently, a demand for strengthening not only heat resistance but also weather resistance of automotive thermoplastic resin compositions including ASA graft copolymers is increasing.

With the increasing demand, a method using a core with a small particle diameter has been proposed, but it leads to the degradation of mechanical properties and fluidity. In addition, a method of graft-polymerizing an aromatic vinyl-based monomer and a vinyl cyan-based monomer along with an alkyl (meth)acrylate (e.g., methyl methacrylate and the like)-based monomer in the preparation of a shell has been proposed, but it leads to the degradation of heat resistance and mechanical properties. Additionally, a method of adding poly(methyl methacrylate) in the compounding of an ASA graft copolymer has been proposed so that weather resistance is enhanced, but it leads to the degradation of heat resistance and mechanical properties.

Accordingly, there is a demand for the development of a graft copolymer excellent in all of heat resistance, weather resistance, and impact resistance.

DISCLOSURE

Technical Problem

The present invention is directed to providing a method of preparing a graft copolymer, which improves weather resistance, impact resistance, and fluidity while maintaining basic physical properties such as heat resistance and the like at equivalent levels to those in the related art, a graft copolymer, and a thermoplastic resin molded article including the graft copolymer.

Technical Solution

One aspect of the present invention provides a method of preparing a graft copolymer that includes: 1) preparing a seed by adding one or more selected from the group consisting of an alkyl (meth)acrylate-based monomer, an aromatic vinyl-based monomer, and a vinyl cyan-based monomer and performing polymerization; 2) in the presence of the seed, preparing a core by adding an alkyl (meth)acrylate-based monomer and performing polymerization; and 3) in the presence of the core, preparing a shell by adding an aromatic vinyl-based monomer and a vinyl cyan-based monomer and performing polymerization, wherein the method further includes adding an alkyl acrylate-based polymer.

Another aspect of the present invention provides a graft copolymer that includes: a seed including one or more selected from the group consisting of an alkyl (meth)acrylate-based monomer, an aromatic vinyl-based monomer unit, and a vinyl cyan-based monomer unit; a core including the seed and an alkyl (meth)acrylate-based monomer unit; a shell including the core, an aromatic vinyl-based monomer unit, and a vinyl cyan-based monomer unit; and an alkyl acrylate-based polymer.

Still another aspect of the present invention provides a thermoplastic resin molded article formed of a thermoplastic resin composition including: the above-described graft copolymer; and a matrix copolymer including an aromatic vinyl-based monomer unit and a vinyl cyan-based monomer unit, wherein the thermoplastic resin molded article has a weather resistance of 1.8 or less and an impact strength of 13 kg·cm/cm or more.

Advantageous Effects

A method of preparing a graft copolymer according to the present invention can produce a graft copolymer and a thermoplastic resin molded article that exhibit improved weather resistance, improved impact resistance, improved fluidity, and improved appearance characteristics while maintaining basic physical properties such as heat resistance and the like at equivalent levels to those in the related art.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the viscosity of an alkyl acrylate-based polymer can be measured using a Brookfield viscometer under the following conditions.

Spindle type: cone type (CPA-52Z), Cone angle=3°, Cone radius=1.2 cm, Gap: 13 μm or less, Measurement shear rate: 10~20/sec, and Measurement temperature: 25° C.

In the present invention, the weight-average molecular weight of an alkyl acrylate-based polymer can be measured as a relative value with respect to standard polystyrene (PS) by gel permeation chromatography (GPC, Waters Breeze) using tetrahydrofuran (THF) as an elution solvent.

In the present invention, the weight-average molecular weight of a shell of a graft copolymer may refer to a weight-average molecular weight of a copolymer including an aromatic vinyl-based monomer unit and a vinyl cyan-based monomer unit which is grafted onto a core.

In the present invention, the weight-average molecular weight of a shell of a graft copolymer can be measured as a relative value with respect to standard PS by GPC (Waters Breeze) after the graft copolymer is dissolved in acetone and centrifuged, and the portion (sol) dissolved in acetone is then dissolved in THF.

In the present invention, the average particle diameters of a seed, a core, and a graft copolymer can be measured by a dynamic light scattering method, specifically, by using a Nicomp 380 instrument (manufactured by PSS Nicomp).

In the specification, an average particle diameter may refer to an arithmetic average particle diameter in the particle size distribution as measured by a dynamic light scattering method. The arithmetic average particle diameter can be measured as an average particle diameter in a scattering intensity distribution, a volume distribution, or a number distribution, and is preferably an average particle diameter measured in the scattering intensity distribution.

In the present invention, whether an alkyl acrylate-based polymer is included in a graft copolymer can be determined by subjecting the graft copolymer to liquid chromatography-mass spectrometry (LC-MS).

In the present invention, weather resistance can be determined by performing an experiment using a Ci4000 Weather-Ometer instrument (manufactured by ATLAS, lamp: xenon-arc lamp, filter: quartz (inner), S.Boro (outer), irradiance: 0.55 W/m$^2$ (340 nm)) under SAE J1960 conditions for 6,000 hours and substituting the experimental results into the following equation.

$$\Delta E = \sqrt{(L'-L_0)^2 + (a'-a_0)^2 + (b'-b_0)^2}$$

In the above equation, L' is the L value measured in the CIE LAB color coordinate system after irradiating a thermoplastic resin molded article with light under SAE J1960 conditions for 6,000 hours, and $L_0$ is the L value measured in the CIE LAB color coordinate system before light irradiation, a' is the a value measured in the CIE LAB color coordinate system after irradiating a thermoplastic resin molded article with light under SAE J1960 conditions for 6,000 hours, and $a_0$ is the a value measured in the CIE LAB color coordinate system before light irradiation, and b' is the b value measured in the CIE LAB color coordinate system after irradiating a thermoplastic resin molded article with light under SAE J1960 conditions for 6,000 hours, and $b_0$ is the b value measured in the CIE LAB color coordinate system before light irradiation.

In the present invention, impact strength can be measured in accordance with ASTM 256.

1. Method of Preparing Graft Copolymer

A method of preparing a graft copolymer according to an embodiment of the present invention includes: 1) preparing a seed by adding one or more selected from the group consisting of an alkyl (meth)acrylate-based monomer, an aromatic vinyl-based monomer, and a vinyl cyan-based monomer and performing polymerization; 2) in the presence of the seed, preparing a core by adding an alkyl (meth) acrylate-based monomer and performing polymerization; and 3) in the presence of the core, preparing a shell by adding an aromatic vinyl-based monomer and a vinyl cyan-based monomer and performing polymerization, wherein the method further includes adding an alkyl acrylate-based polymer.

When the alkyl acrylate-based polymer is added, a graft copolymer with improved weather resistance, improved fluidity, improved mechanical properties, and improved appearance characteristics such as surface gloss and the like can be prepared.

In addition, since the alkyl acrylate-based polymer may serve as a lubricant due to its excellent compatibility with a graft copolymer, it can improve processability of a graft copolymer, lower a processing temperature, and reduce a processing time.

The alkyl acrylate-based polymer may have a weight-average molecular weight of 1,000 to 2,500 g/mol or 1,200 to 2,300 g/mol, with the range of 1,200 to 2,300 g/mol being preferred. When the above-described condition is satisfied, a graft copolymer with improved weather resistance, improved fluidity, improved mechanical properties, and improved appearance characteristics such as surface gloss and the like can be prepared.

The alkyl acrylate-based polymer may have a polydispersity index (Mw/Mn) of 1 to 2 or 1.2 to 1.8, with the range of 1.2 to 1.8 being preferred. When the above-described condition is satisfied, a graft copolymer with improved fluidity and improved impact resistance can be prepared.

The alkyl acrylate-based polymer may have a viscosity of 20 to 1,000 cps or 100 to 900 cps, as measured at 25° C., with the range of 100 to 900 cps being preferred. When the above-described condition is satisfied, a graft copolymer with improved weather resistance, improved fluidity, improved mechanical properties, and improved appearance characteristics such as surface gloss and the like can be prepared.

It is preferable that the alkyl acrylate-based polymer has an APHA color of 60 or less so as not to affect the color of a graft copolymer.

The alkyl acrylate-based polymer may be added in one or more steps of the steps 1) to 3), and may be added after the step 3). It is preferable that the alkyl acrylate-based polymer is added in and/or after the step 3).

When the alkyl (meth)acrylate-based polymer is added in the step 3), a graft copolymer with improved weather resistance, improved impact strength, and improved tensile strength can be prepared.

In addition, when the alkyl acrylate-based polymer is added in the step 3), it is preferable that the alkyl acrylate-based polymer is continuously added along with an aromatic vinyl-based monomer and a vinyl cyan-based monomer at a predetermined rate. When the alkyl acrylate-based polymer is continuously added at a predetermined rate, the dispersibility of the alkyl acrylate-based polymer is improved, and thus weather resistance, impact strength, and the like are enhanced, and the content of a coagulated solid after polymerization can be reduced.

When the alkyl acrylate-based polymer is added after the step 3), a graft copolymer with improved fluidity can be prepared.

In this case, the addition after the step 3) may mean the addition before a coagulation process is performed and after the completion of the step 3).

When the alkyl acrylate-based polymer is added in and/or after the step 3), since polymerization stability is improved compared to when added in the step 1) or the step 2), the content of a coagulated solid is reduced, and a graft copolymer with improved fluidity and improved impact resistance can be prepared.

The alkyl acrylate-based polymer may be added at 0.1 to 3 parts by weight or 0.5 to 2.0 parts by weight with respect to 100 parts by weight of the total weight of monomers added in the method of preparing a graft copolymer, with the range of 0.5 to 2.0 parts by weight being preferred. When the above-described condition is satisfied, a graft copolymer with improved weather resistance, improved fluidity, improved mechanical properties, and improved appearance characteristics such as surface gloss and the like can be prepared.

The alkyl acrylate-based polymer may be one or more selected from the group consisting of poly(methyl acrylate), poly(ethyl acrylate), and poly(butyl acrylate), with poly(butyl acrylate) being preferred.

The alkyl acrylate-based polymer may be directly prepared, or a commercially available product ADP-1200 (manufactured by BASF Corporation) may be used as the alkyl acrylate-based polymer.

Hereinafter, the steps 1) to 3) included in the method of preparing a graft copolymer according to an embodiment of the present invention will be described in detail.

Step 1)

First, one or more selected from the group consisting of an alkyl (meth)acrylate-based monomer, an aromatic vinyl-based monomer, and a vinyl cyan-based monomer are added and polymerized to prepare a seed.

To prepare a seed with a small average particle diameter in a short time in the step 1), it is preferable that an alkyl (meth)acrylate-based monomer is added alone and polymerized, and to prepare a seed with a large average particle diameter considering impact resistance, it is preferable that an alkyl (meth)acrylate-based monomer is added along with an aromatic vinyl-based monomer and a vinyl cyan-based monomer and polymerized.

When the seed has a small average particle diameter, the weather resistance and colorability of a graft copolymer can be improved, and when the seed has a large average particle diameter, the impact resistance of a graft copolymer can be improved.

The alkyl (meth)acrylate-based monomer may be one or more selected from the group consisting of methyl (meth)acrylate, ethyl (meth)acrylate, propyl (meth)acrylate, butyl (meth)acrylate, 2-ethylhexyl (meth)acrylate, decyl (meth)acrylate, and lauryl (meth)acrylate, with butyl acrylate being preferred.

The aromatic vinyl-based monomer may be one or more selected from the group consisting of styrene, α-methylstyrene, α-ethylstyrene, p-methylstyrene, and vinyl toluene, with styrene being preferred.

The vinyl cyan-based monomer may be one or more selected from the group consisting of acrylonitrile, methacrylonitrile, phenyl acrylonitrile, α-chloroacrylonitrile, and ethacrylonitrile, with acrylonitrile being preferred.

The one or more selected from the group consisting of the alkyl (meth)acrylate-based monomer, the aromatic vinyl-based monomer, and the vinyl cyan-based monomer may be added at 4 to 25 wt % or 5 to 24 wt % with respect to the total weight of monomers added in the method of preparing a graft copolymer, with the range of 5 to 24 wt % being preferred. When the above-described range is satisfied, there is an advantage that the balance among weather resistance, fluidity, impact resistance, chemical resistance, colorability, and the like of a graft copolymer is excellent.

In this case, the monomers added in the method of preparing a graft copolymer may refer to the alkyl (meth)acrylate-based monomer, aromatic vinyl-based monomer, and vinyl cyan-based monomer which are added in the preparation of a seed, a core, and a shell.

The seed may have an average particle diameter of 20 to 60 nm or 25 to 55 nm, with the range of 25 to 55 nm being preferred. When the above-described range is satisfied, polymerization stability is improved, and a graft copolymer excellent in weather resistance and impact resistance can be prepared.

The polymerization may be emulsion polymerization and may be performed at 50 to 85° C. or 60 to 80° C., with the range of 60 to 80° C. being preferred. When the above-described range is satisfied, emulsion polymerization can be stably performed.

In the step 1), one or more selected from the group consisting of an initiator, an emulsifier, a crosslinking agent, a grafting agent, an electrolyte, and water may be further added.

The initiator may be a radical initiator. The initiator may be one or more selected from the group consisting of inorganic peroxides such as sodium persulfate, potassium persulfate, ammonium persulfate, potassium perphosphate, hydrogen peroxide, and the like, organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butylperoxy isobutyrate, and the like, azobis(isobutyronitrile), azobis-2,4-dimethylvaleronitrile, azobis(cyclohexanecarbonitrile), and azobis(methyl isobutyrate), with inorganic peroxides being preferred and potassium persulfate being more preferred.

The initiator may be added at 0.01 to 3 parts by weight or 0.02 to 2.5 parts by weight with respect to 100 parts by weight of the total weight of monomers added in the method of preparing a graft copolymer, with the range of 0.02 to 2.5 parts by weight being preferred. When the above-described range is satisfied, polymerization can be easily performed.

The emulsifier may be one or more selected from the group consisting of a metal salt of an alkyl sulfosuccinic acid, a metal salt of an alkyl sulfuric acid ester, a metal salt of a rosin acid, and a metal salt of a dimer acid, with the metal salt of an alkyl sulfuric acid ester being preferred.

The metal salt of an alkyl sulfosuccinic acid may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, and di-2-ethylhexyl sulfosuccinate.

The metal salt of an alkyl sulfuric acid ester may be one or more selected from the group consisting of sodium dodecyl sulfate, sodium lauryl sulfate, sodium dodecylbenzene sulfate, sodium octadecyl sulfate, sodium oleic sulfate, potassium dodecyl sulfate, and potassium octadecyl sulfate.

The metal salt of a rosin acid may be one or more selected from the group consisting of potassium rosinate and sodium rosinate.

As the metal salt of a dimer acid, a commercially available product FS200 (manufactured by LG Household & Health Care Ltd.) may be used.

The emulsifier may be added at 0.01 to 5 parts by weight or 0.05 to 4.5 parts by weight with respect to 100 parts by weight of the total weight of monomers added in the method of preparing a graft copolymer, with the range of 0.05 to 4.5 parts by weight being preferred. When the above-described range is satisfied, a seed, specifically, a seed latex, with a desired average particle diameter can be easily prepared.

The crosslinking agent may be one or more selected from the group consisting of ethylene glycol di(meth)acrylate, polyethylene glycol di(meth)acrylate, polypropylene glycol di(meth)acrylate, divinylbenzene, diethylene glycol di(meth)acrylate, triethylene glycol di(meth)acrylate, 1,3-butadiol dimethacrylate, hexanediol ethoxylate diacrylate, hexanediol propoxylate di(meth)acrylate, neopentyl glycol dimethacrylate, neopentyl glycol ethoxylate di(meth)acrylate, neopentyl glycol propoxylate di(meth)acrylate, trimethylolmethane tri(meth)acrylate, trimethylolpropane tri(meth)acrylate, trimethylpropane ethoxylate tri(meth)acrylate, trimethylpropane propoxylate tri(meth)acrylate, pentaerythritol ethoxylate tri(meth)acrylate, pentaerythritol propoxylate tri(meth)acrylate, and vinyltrimethoxysilane, with ethylene glycol di(meth)acrylate being preferred.

The crosslinking agent may be added at 0.01 to 1 part by weight or 0.02 to 0.8 part by weight with respect to 100 parts by weight of the total weight of monomers added in the method of preparing a graft copolymer, with the range of 0.02 to 0.8 part by weight being preferred. When the above-described range is satisfied, a seed has an appropriate degree of crosslinking and is appropriately stacked in the preparation of a core, thereby a core with a desired average particle diameter can be prepared.

The grafting agent may be one or more selected from the group consisting of allyl methacrylate, triallyl isocyanurate, diallylamine, and triallylamine, with allyl methacrylate being preferred.

The grafting agent may be added at 0.001 to 3.0 parts by weight or 0.005 to 2.5 parts by weight with respect to 100 parts by weight of the total weight of monomers added in the method of preparing a graft copolymer, with the range of 0.005 to 2.5 parts by weight being preferred. When the above-described range is satisfied, a seed has an appropriate degree of crosslinking and is appropriately stacked in the preparation of a core, thereby a core with a desired average particle diameter can be prepared.

The electrolyte may be one or more selected from the group consisting of KCl, NaCl, KHCO$_3$, NaHCO$_3$, K$_2$CO$_3$, Na$_2$CO$_3$, KHSO$_3$, NaHSO$_4$, Na$_2$S$_2$O$_7$, K$_4$P$_2$O$_7$, K$_3$PO$_4$, Na$_3$PO$_4$ or Na$_2$HPO$_4$, KOH, and NaOH, with KOH being preferred.

The electrolyte may be added at 0.001 to 1 part by weight or 0.01 to 0.8 part by weight with respect to 100 parts by weight of the total weight of monomers added in the method of preparing a graft copolymer, with the range of 0.01 to 0.8 part by weight being preferred. When the above-described range is satisfied, a seed, specifically, a seed latex, with a small particle diameter can be stably obtained.

The water may be distilled water or ion exchanged water.

Step 2)

Subsequently, in the presence of the seed, an alkyl (meth)acrylate-based monomer is added and polymerized to prepare a core.

Types of the alkyl (meth)acrylate-based monomer have been described above.

The alkyl (meth)acrylate-based monomer may be added at 25 to 55 wt % or 30 to 50 wt % with respect to the total weight of monomers added in the method of preparing a graft copolymer, with the range of 30 to 50 wt % being preferred. When the above-described range is satisfied, there is an advantage that the balance among weather resistance, fluidity, and chemical resistance of a graft copolymer is excellent.

The alkyl (meth)acrylate-based monomer may be continuously added at a predetermined rate. When the alkyl (meth)acrylate-based monomer is added by the above-described method, a runaway reaction caused by excessive release of heat due to an exothermic reaction during polymerization can be easily suppressed.

The polymerization may be emulsion polymerization and may be performed at 50 to 85° C. or 60 to 80° C., with the range of 60 to 80° C. being preferred. When the above-described range is satisfied, emulsion polymerization can be stably performed.

The core has an average particle diameter larger than that of the seed, and may have an average particle diameter of 40 to 80 nm or 45 to 75 nm, with the range of 45 to 75 nm being preferred. When the above-described range is satisfied, polymerization stability is excellent, and a graft copolymer excellent in weather resistance, colorability, and impact strength can be prepared.

In the step 2), one or more selected from the group consisting of an initiator, an emulsifier, a crosslinking agent, a grafting agent, and water may be further added, and, in order to easily suppress a runaway reaction caused by excessive release of heat due to an exothermic reaction during polymerization, may be continuously added at a predetermined rate along with the alkyl (meth)acrylate-based monomer.

Types of the initiator have been described above. As the initiator, inorganic peroxides are preferred, and potassium persulfate is more preferred.

The initiator may be added at 0.01 to 3 parts by weight or 0.02 to 2.5 parts by weight with respect to 100 parts by weight of the total weight of monomers added in the method of preparing a graft copolymer, with the range of 0.02 to 2.5 parts by weight being preferred. When the above-described range is satisfied, polymerization can be easily performed.

Types of the emulsifier have been described above. As the emulsifier, the metal salt of an alkyl sulfuric acid ester is preferred.

The emulsifier may be added at 0.01 to 5 parts by weight or 0.05 to 4.5 parts by weight with respect to 100 parts by weight of the total weight of monomers added in the method of preparing a graft copolymer, with the range of 0.05 to 4.5 parts by weight being preferred. When the above-described range is satisfied, a core with a desired average particle diameter can be easily prepared.

Types of the crosslinking agent have been described above.

The crosslinking agent may be added at 0.01 to 1 part by weight or 0.02 to 0.8 part by weight with respect to 100 parts by weight of the total weight of monomers added in the method of preparing a graft copolymer, with the range of 0.02 to 0.8 part by weight being preferred. When the above-described range is satisfied, a core can have an appropriate degree of crosslinking.

Types of the grafting agent have been described above.

The grafting agent may be added at 0.01 to 3.0 parts by weight or 0.02 to 2.5 parts by weight with respect to 100 parts by weight of the total weight of monomers added in the method of preparing a graft copolymer, with the range of 0.02 to 2.5 parts by weight being preferred. When the above-described range is satisfied, a core can have an appropriate degree of crosslinking.

The water may be distilled water or ion exchanged water.

Step 3)

Subsequently, in the presence of the core, an aromatic vinyl-based monomer and a vinyl cyan-based monomer are added and polymerized to prepare a shell.

Types of the aromatic vinyl-based monomer and the vinyl cyan-based monomer have been described above.

The sum of the added aromatic vinyl-based monomer and vinyl cyan-based monomer may be 30 to 60 wt % or 35 to 55 wt % with respect to the total weight of monomers added in the method of preparing a graft copolymer, with the range of 35 to 55 wt % being preferred. When the above-described range is satisfied, there is an advantage that the balance among weather resistance, fluidity, and chemical resistance of a graft copolymer is excellent.

The aromatic vinyl-based monomer and the vinyl cyan-based monomer may be added in a weight ratio of 65:35 to 85:15 or 70:30 to 80:20, with the range of 70:30 to 80:20 being preferred. When the above-described range is satisfied, there is an advantage that the balance between fluidity and chemical resistance of a graft copolymer is excellent.

The aromatic vinyl-based monomer and the vinyl cyan-based monomer may be continuously added at a predetermined rate. When the aromatic vinyl-based monomer and the vinyl cyan-based monomer are added by the above-described method, a runaway reaction caused by excessive release of heat due to an exothermic reaction during polymerization can be easily suppressed.

The polymerization may be emulsion polymerization and may be performed at 50 to 85° C. or 60 to 80° C., with the range of 60 to 80° C. being preferred. When the above-described range is satisfied, emulsion polymerization can be stably performed.

The graft copolymer including the shell has an average particle diameter larger than that of the core, and may have an average particle diameter of 60 to 110 nm or 65 to 105 nm, with the range of 65 to 105 nm being preferred. When the above-described range is satisfied, polymerization stability is excellent, and thus a graft copolymer excellent in weather resistance and impact strength can be prepared.

In the step 3), one or more selected from the group consisting of an initiator, an activator, an emulsifier, a molecular weight controlling agent, and water may be further added, and may be continuously added at a predetermined rate along with the alkyl (meth)acrylate-based monomer.

Types of the initiator have been described above. As the initiator, organic peroxides are preferred, and cumene hydroperoxide is more preferred.

The initiator may be added at 0.01 to 3 parts by weight or 0.02 to 2.5 parts by weight with respect to 100 parts by weight of the total weight of monomers added in the method of preparing a graft copolymer, with the range of 0.02 to 2.5 parts by weight being preferred. When the above-described range is satisfied, polymerization can be easily performed.

The activator may be one or more selected from the group consisting of sodium formaldehyde sulfoxylate, sodium ethylenediaminetetraacetate, ferrous sulfate, dextrose, sodium pyrophosphate, sodium pyrophosphate anhydrous, and sodium sulfate, with one or more selected from the group consisting of ferrous sulfate, dextrose, and sodium pyrophosphate being preferred.

The activator may be added at 0.01 to 1 part by weight or 0.1 to 0.8 part by weight with respect to 100 parts by weight of the total weight of monomers added in the method of preparing a graft copolymer, with the range of 0.1 to 0.8 part by weight being preferred. When the above-described content is satisfied, the initiation of polymerization can be promoted.

Types of the emulsifier have been described above. As the emulsifier, the metal salt of a rosin acid is preferred.

The emulsifier may be added at 0.1 to 3 parts by weight or 0.5 to 2.5 parts by weight with respect to 100 parts by weight of the total weight of monomers added in the method of preparing a graft copolymer, with the range of 0.5 to 2.5 parts by weight being preferred. When the above-described range is satisfied, a graft copolymer with a desired average particle diameter can be easily prepared.

The molecular weight controlling agent may be an α-methylstyrene dimer, mercaptans such as t-dodecyl mercaptan, n-dodecyl mercaptan, and octyl mercaptan, halogenated hydrocarbons such as carbon tetrachloride, methylene chloride, and methylene bromide, or sulfur-containing compounds such as tetraethylthiuram disulfide, dipentamethylene thiuram disulfide, and diisopropyl xanthogen disulfide, with t-dodecyl mercaptan being preferred.

The molecular weight controlling agent may be added at 0.001 to 1 part by weight or 0.01 to 0.8 part by weight with respect to 100 parts by weight of the total weight of monomers added in the method of preparing a graft copolymer, with the range of 0.01 to 0.8 part by weight being preferred. When the above-described range is satisfied, the weight-average molecular weight of the shell is appropriately maintained, and thus the mechanical properties and surface characteristics of a graft copolymer can be improved.

The water may be distilled water or ion exchanged water.

After the step 3) of the method of preparing a graft copolymer according to an embodiment of the present invention is completed, coagulating, aging, dehydration, washing, and drying processes may be further performed to prepare a graft copolymer powder.

2. Graft Copolymer

A graft copolymer according to another embodiment of the present invention includes: a seed including one or more selected from the group consisting of an alkyl (meth) acrylate-based monomer unit, an aromatic vinyl-based monomer unit, and a vinyl cyan-based monomer unit; a core including the seed and an alkyl (meth)acrylate-based monomer unit; a shell including the core, an aromatic vinyl-based monomer unit, and a vinyl cyan-based monomer unit; and an alkyl acrylate-based polymer.

The alkyl (meth)acrylate-based polymer can improve the weather resistance, impact strength, and tensile strength of a graft copolymer.

The alkyl acrylate-based polymer may have a weight-average molecular weight of 1,000 to 2,500 g/mol or 1,200 to 2,300 g/mol, with the range of 1,200 to 2,300 g/mol being preferred. When the above-described condition is satisfied, the weather resistance, fluidity, mechanical properties, and appearance characteristics such as surface gloss and the like of a graft copolymer can be improved.

The alkyl acrylate-based polymer may have a viscosity of 20 to 1,000 cps or 100 to 900 cps, as measured at 25° C., with the range of 100 to 900 cps being preferred. When the above-described condition is satisfied, the weather resistance, fluidity, mechanical properties, and appearance characteristics such as surface gloss and the like of a graft copolymer can be improved.

Other descriptions of the alkyl acrylate-based polymer have been described in "1. Method of preparing graft copolymer".

Since the alkyl (meth)acrylate-based polymer has hydrophobicity and excellent compatibility with the core, it may be disposed in/at one or more regions of the shell and an interface between the core and the shell, wherein a significantly large amount thereof may be disposed at an interface between the core and the shell compared to in the shell.

When the alkyl acrylate-based polymer is disposed in/at the above-described regions, the weather resistance, impact strength, and tensile strength of a graft copolymer can be improved.

The core may have an average particle diameter larger than that of the seed, and may have an average particle diameter of 40 to 80 nm or 45 to 75 nm, with the range of 45 to 75 nm being preferred. When the above-described range is satisfied, polymerization stability is excellent, and a graft copolymer excellent in weather resistance, colorability, and impact strength can be prepared.

Meanwhile, other than the descriptions of the seed, the core, and the shell, as described in "1. Method of preparing graft copolymer", the graft copolymer according to another embodiment of the present invention may be prepared by the method of preparing a graft copolymer according to an embodiment of the present invention.

3. Thermoplastic Resin Composition

A thermoplastic resin composition according to still another embodiment of the present invention includes: the graft copolymer according to an embodiment of the present invention; and a matrix copolymer including an aromatic vinyl-based monomer unit and a vinyl cyan-based monomer unit.

The aromatic vinyl-based monomer unit included in the matrix copolymer may be one or more selected from the group consisting of the units derived from styrene, α-methylstyrene, α-ethylstyrene, p-methylstyrene, and vinyl toluene, with the unit derived from α-methylstyrene being preferred.

The a vinyl cyan-based monomer unit included in the matrix copolymer may be one or more selected from the group consisting of the units derived from acrylonitrile, methacrylonitrile, phenyl acrylonitrile, α-chloroacrylonitrile, and ethacrylonitrile, with the unit derived from acrylonitrile being preferred.

The matrix copolymer may include the aromatic vinyl-based monomer unit and the vinyl cyan-based monomer unit in a weight ratio of 60:40 to 80:20 or 65:35 to 75:25, with the range of 65:35 to 75:25 being preferred. When the above-described content is satisfied, a thermoplastic resin composition excellent in all of heat resistance, fluidity, and chemical resistance can be provided.

The thermoplastic resin composition may include the graft copolymer and the matrix copolymer in a weight ratio of 60:40 to 10:90 or 55:45 to 10:85, with the range of 55:45 to 10:85 being preferred. When the above-described range is satisfied, a thermoplastic resin composition excellent in all of weather resistance, heat resistance, fluidity, chemical resistance, and appearance characteristics can be prepared.

The thermoplastic resin composition may further include an additive such as a dye, a pigment, a lubricant, an antioxidant, a UV stabilizer, a thermal stabilizer, a reinforcing agent, a filler, a flame retardant, a foaming agent, a plasticizer, a matting agent, or the like depending on the area of application.

4. Thermoplastic Resin Molded Article

A thermoplastic resin molded article formed of the thermoplastic resin composition according to still another embodiment of the present invention has a weather resistance of 1.8 or less and an impact strength of 13 kg·cm/cm or more, preferably, a weather resistance of 1.7 or less and an impact strength of 13.5 kg·cm/cm or more.

When the above-described conditions are satisfied, the thermoplastic resin molded article can be suitable as automotive exterior materials which require high weather resistance and furniture sheets.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Example 1

<Preparation of Seed>

6.5 parts by weight of butyl acrylate, 1.5 parts by weight of sodium dodecyl sulfate as an emulsifier, 0.04 part by weight of ethylene glycol dimethacrylate as a crosslinking agent, 0.015 part by weight of allyl methacrylate as a grafting agent, 0.1 part by weight of KOH as an electrolyte, and 60 parts by weight of distilled water were batch-added to a nitrogen-substituted reactor, and the temperature inside the reactor was raised to 70° C. Afterward, 0.04 part by weight of potassium persulfate as an initiator was batch-added to initiate polymerization, and the polymerization was performed for 1 hour and then terminated, thereby obtaining a seed.

<Preparation of Core>

Polymerization was performed for 2 hours while continuously adding a mixture including 43.5 parts by weight of butyl acrylate, 0.7 part by weight of sodium dodecyl sulfate as an emulsifier, 0.25 part by weight of ethylene glycol dimethacrylate as a crosslinking agent, 0.09 part by weight of allyl methacrylate as a grafting agent, 35 parts by weight of distilled water, and 0.03 part by weight of potassium persulfate as an initiator to the seed-containing reactor at 70° C. and a predetermined rate. After the addition was terminated, polymerization was further performed for another 1 hour and then terminated, thereby obtaining a core.

<Preparation of Shell>

Polymerization was performed for 2.5 hours while continuously adding each of a first mixture including 23 parts by weight of distilled water, 38 parts by weight of styrene, 12 parts by weight of acrylonitrile, 1.0 part by weight of poly(butyl acrylate) (ADP-1200 manufactured by BASF Corporation), 1.8 parts by weight of potassium rosinate as an emulsifier, 0.1 part by weight of t-dodecyl mercaptan as a molecular weight controlling agent, and 0.05 part by weight of cumene hydroperoxide as an initiator and a second mixture including 0.09 part by weight of sodium pyrophosphate as an activator, 0.12 part by weight of dextrose, and 0.002 part by weight of ferrous sulfate to the core-containing reactor at 75° C. and a predetermined rate. After the continuous addition was completed, polymerization was further performed at 75° C. for another 1 hour and then terminated by cooling the temperature inside the reactor to 60° C., thereby preparing a graft copolymer latex including a shell.

<Preparation of Graft Copolymer Powder>

The graft copolymer latex was coagulated at 70° C. and atmospheric pressure by applying 0.8 part by weight of an aqueous calcium chloride solution (concentration: 23 wt %) thereto, aged at 93° C., dehydrated, washed, and then dried with 90° C. hot air for 30 minutes, thereby preparing a graft copolymer powder.

<Preparation of Thermoplastic Resin Composition>

A thermoplastic resin composition including 40 parts by weight of the graft copolymer powder, 4 parts by weight of a large-diameter graft copolymer powder (SA927 manufactured by LG Chem Ltd., average particle diameter of graft copolymer: 400 nm), and 56 parts by weight of a hard matrix copolymer (100UH manufactured by LG Chem Ltd.) was prepared.

Example 2

A graft copolymer powder and a thermoplastic resin composition were prepared in the same manner as in Example 1 except that 1 part by weight of poly(butyl acrylate) (ADP-1200 manufactured by BASF Corporation) was added after polymerization was terminated in the preparation of a shell.

Example 3

<Preparation of Seed>

10 parts by weight of butyl acrylate, 1.8 parts by weight of sodium dodecyl sulfate as an emulsifier, 0.06 part by weight of ethylene glycol dimethacrylate as a crosslinking agent, 0.035 part by weight of allyl methacrylate as a grafting agent, 0.1 part by weight of KOH as an electrolyte, and 65 parts by weight of distilled water were batch-added to a nitrogen-substituted reactor, and the temperature inside the reactor was raised to 70° C. Afterward, 0.04 part by weight of potassium persulfate as an initiator was batch-added to initiate polymerization, and the polymerization was performed for 1 hour and then terminated, thereby preparing a seed.

<Preparation of Core>

Polymerization was performed for 2.0 hours while continuously adding a mixture including 40 parts by weight of butyl acrylate, 0.5 part by weight of sodium dodecyl sulfate as an emulsifier, 0.15 part by weight of ethylene glycol dimethacrylate as a crosslinking agent, 0.075 part by weight of allyl methacrylate as a grafting agent, 32 parts by weight of distilled water, and 0.05 part by weight of potassium persulfate as an initiator to the seed-containing reactor at 70° C. and a predetermined rate. After the addition was terminated, polymerization was further performed for another 1 hour and then terminated, thereby obtaining a core.

<Preparation of Shell>

Polymerization was performed for 2.5 hours while continuously adding each of a first mixture including 20 parts by weight of distilled water, 38 parts by weight of styrene, 12 parts by weight of acrylonitrile, 1.0 part by weight of poly(butyl acrylate) (ADP-1200 manufactured by BASF Corporation), 1.8 parts by weight of potassium rosinate as an emulsifier, 0.1 part by weight of t-dodecyl mercaptan as a molecular weight controlling agent, and 0.05 part by weight of cumene hydroperoxide as an initiator and a second mixture including 0.09 part by weight of sodium pyrophosphate as an activator, 0.12 part by weight of dextrose, and 0.002 part by weight of ferrous sulfate to the core-containing reactor at 75° C. and a predetermined rate. After the continuous addition was completed, polymerization was further performed at 75° C. for another 1 hour and then terminated by cooling the temperature inside the reactor to 60° C., thereby preparing a graft copolymer latex including a shell.

<Preparation of Graft Copolymer Powder>

The graft copolymer latex was coagulated at 70° C. and atmospheric pressure by applying 0.8 part by weight of an aqueous calcium chloride solution (concentration: 23 wt %) thereto, aged at 93° C., dehydrated, washed, and then dried with 90° C. hot air for 30 minutes, thereby preparing a graft copolymer powder.

<Preparation of Thermoplastic Resin Composition>

A thermoplastic resin composition including 40 parts by weight of the graft copolymer powder, 4 parts by weight of a large-diameter graft copolymer powder (SA927 manufactured by LG Chem Ltd., average particle diameter of graft copolymer: 400 nm), and 56 parts by weight of a hard matrix copolymer (100UH manufactured by LG Chem Ltd.) was prepared.

Example 4

A graft copolymer powder and a thermoplastic resin composition were prepared in the same manner as in Example 3 except that 1 part by weight of poly(butyl acrylate) (ADP-1200 manufactured by BASF Corporation) was added after polymerization was terminated in the preparation of a shell.

Example 5

A graft copolymer powder and a thermoplastic resin composition were prepared in the same manner as in Example 1 except that 0.5 part by weight of poly(butyl acrylate) (ADP-1200 manufactured by BASF Corporation) was added in the preparation of a shell.

Example 6

A graft copolymer powder and a thermoplastic resin composition were prepared in the same manner as in Example 1 except that 1.5 part by weight of poly(butyl acrylate) (ADP-1200 manufactured by BASF Corporation) was added in the preparation of a shell.

Comparative Example 1

A graft copolymer powder and a thermoplastic resin composition were prepared in the same manner as in Example 1 except that poly(butyl acrylate) (ADP-1200 manufactured by BASF Corporation) was not added in the preparation of a shell.

Comparative Example 2

<Preparation of Seed>

6 parts by weight of butyl acrylate, 0.8 parts by weight of sodium dodecyl sulfate as an emulsifier, 0.04 part by weight of ethylene glycol dimethacrylate as a crosslinking agent, 0.02 part by weight of allyl methacrylate as a grafting agent, 0.1 part by weight of KOH as an electrolyte, and 45 parts by weight of distilled water were batch-added to a nitrogen-substituted reactor, and the temperature inside the reactor was raised to 70° C. Afterward, 0.04 part by weight of potassium persulfate as an initiator was batch-added to initiate polymerization, and the polymerization was performed for 1 hour and then terminated, thereby preparing a seed.

<Preparation of Core>

Polymerization was performed for 2.5 hours while continuously adding a mixture including 44 parts by weight of butyl acrylate, 0.5 part by weight of sodium dodecyl sulfate as an emulsifier, 0.2 part by weight of ethylene glycol dimethacrylate as a crosslinking agent, 0.2 part by weight of allyl methacrylate as a grafting agent, 30 parts by weight of distilled water, and 0.05 part by weight of potassium persulfate as an initiator to the seed-containing reactor at 70° C. and a predetermined rate. After the addition was terminated, polymerization was further performed for another 1 hour and then terminated, thereby obtaining a core.

<Preparation of Shell>

Polymerization was performed for 2.5 hours while continuously adding each of a first mixture including 23 parts by weight of distilled water, 38 parts by weight of styrene, 12 parts by weight of acrylonitrile, 0.8 parts by weight of FS200 (manufactured by LG Household & Health Care Ltd.) as an emulsifier, 0.1 part by weight of t-dodecyl mercaptan as a molecular weight controlling agent, and 0.05 part by weight of cumene hydroperoxide as an initiator and a second mixture including 0.09 part by weight of sodium pyrophosphate as an activator, 0.12 part by weight of dextrose, and 0.002 part by weight of ferrous sulfate to the core-containing reactor at 75° C. and a predetermined rate. After the continuous addition was completed, polymerization was further performed at 75° C. for another 1 hour and then terminated by cooling the temperature inside the reactor to 60° C., thereby preparing a graft copolymer latex including a shell.

<Preparation of Graft Copolymer Powder>

The graft copolymer latex was coagulated at 70° C. and atmospheric pressure by applying 0.8 part by weight of an aqueous calcium chloride solution thereto, aged at 93° C., dehydrated, washed, and then dried with 90° C. hot air for 30 minutes, thereby preparing a graft copolymer powder.

<Preparation of Thermoplastic Resin Composition>

A thermoplastic resin composition including 40 parts by weight of the graft copolymer powder, 4 parts by weight of a large-diameter graft copolymer powder (SA927 manufactured by LG Chem Ltd., average particle diameter of graft copolymer: 400 nm), and 56 parts by weight of a hard matrix copolymer (100UH manufactured by LG Chem Ltd.) was prepared.

Experimental Example 1

Physical properties of the graft copolymers of Examples and Comparative Examples were measured by the methods described below, and results thereof are shown in the following Table 1 and Table 2.

(1) Average particle diameter (nm): measured by a dynamic light scattering method using a particle size analyzer (Nicomp 380).

(2) Polymerization conversion rate: (Weight of solid content of actually obtained graft copolymer/Weight of solid content of prescriptively added monomers)×100

(3) Degree of grafting (%): Weight (g) of grafted monomers/Weight (g) of rubber×100

Weight of grafted monomers (g): Weight of insoluble substance (gel) obtained after 1 g of graft copolymer was dissolved in 30 g of acetone and centrifuged Weight of rubber (g): Weight of theoretically added butyl acrylate in graft copolymer powder (4) Weight-average molecular weight of shell (g/mol): measured as a relative value with respect to standard polystyrene (PS) by GPC after the portion (sol) dissolved in acetone in the measurement of a degree of grafting was dissolved in THF.

TABLE 1

| Classification | Average particle diameter (nm) | | | Polymerization conversion rate (%) | Degree of grafting (%) | Weight-average molecular weight of shell (g/mol) |
| --- | --- | --- | --- | --- | --- | --- |
| | Seed | Core | Graft copolymer | | | |
| Example 1 | 34 | 65 | 85 | 99.5 | 26 | 120,000 |
| Example 2 | 34 | 65 | 86 | 99.2 | 26 | 121,000 |
| Example 3 | 45 | 66 | 88 | 99.5 | 27 | 120,000 |
| Example 4 | 34 | 65 | 87 | 99.2 | 27 | 120,000 |
| Example 5 | 34 | 65 | 86 | 99.3 | 26.5 | 122,000 |
| Example 6 | 34 | 65 | 88 | 99.4 | 26.5 | 115,000 |
| Comparative Example 1 | 34 | 65 | 86 | 99.2 | 28 | 110,000 |
| Comparative Example 2 | 60 | 105 | 145 | 98.0 | 33 | 100,000 |

Comparative Example 3

<Preparation of Thermoplastic Resin Composition>

A thermoplastic resin composition including 40 parts by weight of the graft copolymer powder of Comparative Example 2, 4 parts by weight of a large-diameter graft copolymer powder (SA927 manufactured by LG Chem Ltd., average particle diameter of graft copolymer: 400 nm), 51 parts by weight of a hard matrix copolymer (100UH manufactured by LG Chem Ltd.), and poly(methyl methacrylate) (BA611 Grade manufactured by LG MMA Corp.) was prepared.

Comparative Example 4

<Preparation of Thermoplastic Resin Composition>

A thermoplastic resin composition including 39 parts by weight of the graft copolymer powder of Comparative Example 1, 1 part by weight of poly(butyl acrylate) (ADP-1200 manufactured by BASF Corporation), 4 parts by weight of a large-diameter graft copolymer powder (SA927 manufactured by LG Chem Ltd., average particle diameter of graft copolymer: 400 nm), and 56 parts by weight of a hard matrix copolymer (100UH manufactured by LG Chem Ltd.) was prepared.

Referring to Table 1, it can be confirmed that the graft copolymers of Examples 1 to 6 realized levels of an average particle diameter and a polymerization conversion rate equivalent to those of the graft copolymer of Comparative Example 1, whereas they exhibited a decreased degree of grafting and an increased weight-average molecular weight. From these results, it can be seen that an alkyl acrylate-based polymer does not affect the average particle diameter and polymerization conversion rate of a graft copolymer, but affects the degree of grafting and the weight-average molecular weight.

Meanwhile, in the case of the graft copolymer of Comparative Example 2, a seed and a core which have large average particle diameters were prepared because a small amount of an emulsifier was added in the preparation of a seed compared with Examples. In addition, it can be seen that since the amount of the initiator was increased relative to the number of cores in the preparation of a shell, the weight-average molecular weight of a shell was decreased, and thus an increased amount of styrene unit and acrylonitrile unit were grafted onto the core to increase the degree of grafting.

Experimental Example 2

Each of the thermoplastic resin compositions of Examples and Comparative Examples was homogeneously mixed with 1.5 parts by weight of a lubricant (EBS manufactured by LG Household & Health Care Ltd.), 1.0 part by weight of an antioxidant (IR1076 manufactured by BASF Corporation), and 1.0 part by weight of a UV stabilizer (Tinuvin770 manufactured by BASF Corporation), and then the mixture was prepared in the form of a pellet using a 36-phi extrusion kneading machine at 220° C. The fluidity of the pellet was measured by the method described below, and results thereof are shown in the following Table 2 and Table 3.

(5) Melt flow index (MI; g/10 min): measured in accordance with ASTM D-1238 at 220° C. and 10 kg.

Experimental Example 3

The pellets prepared in Experimental Example 2 were injection-molded to prepare specimens. Physical properties of the specimens were measured by the methods described below, and results thereof are shown in Tables 2 and 3.

(6) Weather resistance (SE): determined by performing an experiment using an accelerated weather resistance testing instrument (Ci4000 Weather-Ometer manufactured by ATLAS, xenon-arc lamp, quartz (inner)/S.Boro (outer) filter, irradiance 0.55 W/m² at 340 nm) under SAE J1960 conditions for 6,000 hours. The following ΔE is an arithmetic average value calculated using values obtained before and after the experiment for accelerated weather resistance, and values closer to 0 indicate better weather resistance.

$$\Delta E = \sqrt{(L'-L_0)^2 + (a'-a_0)^2 + (b'-b_0)^2}$$

In the above equation, L' is the L value measured in the CIE LAB color coordinate system after irradiating a thermoplastic resin molded article with light under SAE J1960 conditions for 6,000 hours, and $L_0$ is the L value measured in the CIE LAB color coordinate system before light irradiation, a' is the a value measured in the CIE LAB color coordinate system after irradiating a thermoplastic resin molded article with light under SAE J1960 conditions for 6,000 hours, and $a_0$ is the a value measured in the CIE LAB color coordinate system before light irradiation, and b' is the b value measured in the CIE LAB color coordinate system after irradiating a thermoplastic resin molded article with light under SAE J1960 conditions for 6,000 hours, and $b_0$ is the b value measured in the CIE LAB color coordinate system before light irradiation.

(7) IZOD impact strength (kg/cm²): measured in accordance with ASTM 256 using the specimen whose thickness was adjusted to ¼ inch.

(8) Tensile strength (kg/cm²): measured in accordance with ASTM D638.

(9) Heat deflection temperature (° C.): measured in accordance with ASTM D648.

TABLE 2

| Classification | Example 1 | Example 2 | Example 3 | Example 4 | Example 5 | Example 6 |
|---|---|---|---|---|---|---|
| Fluidity (g/10 min) | 8.0 | 8.1 | 8.2 | 7.9 | 7.2 | 8.8 |
| Weather resistance (ΔE) | 1.4 | 1.6 | 1.4 | 1.6 | 1.7 | 1.3 |
| Impact strength (kg · cm/cm, ¼ inch) | 14.0 | 13.8 | 14.2 | 14.0 | 13.0 | 15.0 |
| Tensile strength (kg/cm²) | 510 | 507 | 508 | 508 | 515 | 505 |
| Heat deflection temperature (° C.) | 90.5 | 91.0 | 90.5 | 90.5 | 91.1 | 90.0 |

TABLE 3

| Classification | Comparative Example 1 | Comparative Example 2 | Comparative Example 3 | Comparative Example 4 |
|---|---|---|---|---|
| Fluidity (g/10 min) | 5.2 | 5.5 | 7.5 | 7.0 |
| Weather resistance (ΔE) | 2.5 | 6.0 | 2.0 | 2.1 |
| Impact strength (kg · cm/cm, ¼ inch) | 10.0 | 13.0 | 11.0 | 11 |
| Tensile strength (kg/cm²) | 510 | 480 | 490 | 500 |
| Heat deflection temperature (° C.) | 91.0 | 89.0 | 86.0 | 90 |

Referring to Table 2 and Table 3, it can be seen that the thermoplastic resin specimens of Example 1 to Example 6 exhibited superior levels of processability (fluidity), weather resistance, and impact strength and equivalent levels of tensile strength and heat resistance (heat deflection temperature) compared to those of the specimen of Comparative Example 1.

In addition, it can be seen that the thermoplastic resin specimens of Example 1 to Example 6 exhibited an equivalent or higher level of impact resistance and remarkably superior levels of processability, weather resistance, tensile strength, and heat resistance compared to those of the thermoplastic resin specimen of Comparative Example 2 which included a graft copolymer with a large average particle diameter.

Additionally, it can be seen that the thermoplastic resin specimens of Example 1 to Example 6 exhibited an equivalent or higher level of processability and remarkably superior levels of weather resistance, impact strength, tensile strength, and heat resistance compared to those of the thermoplastic resin specimen of Comparative Example 3 which included a graft copolymer with a large average particle diameter and poly(methyl methacrylate).

In addition, it can be seen that the thermoplastic resin composition of Comparative Example 4, in which poly (butyl acrylate) was included in the same amount as Example 1 to Example 4, exhibited degraded properties in terms of processability, weather resistance, and impact strength because poly(butyl acrylate) was not added during the preparation of a graft copolymer.

From these results, it can be seen that the graft copolymer according to an embodiment of the present invention is able to realize excellent impact resistance, excellent processability, and excellent weather resistance even without increasing an average particle diameter to enhance impact resistance or further including poly(methyl methacrylate) to enhance processability and weather resistance. In addition, it can be seen that only when poly(butyl acrylate) is added during the preparation of a graft copolymer, processability, weather resistance, and impact strength are remarkably improved.

The invention claimed is:

1. A method of preparing a graft copolymer, comprising:
1) preparing a seed by adding one or more selected from the group consisting of an alkyl (meth)acrylate-based monomer, an aromatic vinyl-based monomer, and a vinyl cyan-based monomer and performing polymerization;
2) in the presence of the seed, preparing a core by adding an alkyl (meth)acrylate-based monomer and performing polymerization; and
3) in the presence of the core, preparing a shell by adding an aromatic vinyl-based monomer and a vinyl cyan-based monomer and performing polymerization,
wherein the method further includes adding an alkyl acrylate-based polymer after performing step 3) and before coagulating the graft copolymer.

2. The method of claim 1, wherein the alkyl acrylate-based polymer has a weight-average molecular weight of 1,000 to 2,500 g/mol.

3. The method of claim 1, wherein the alkyl acrylate-based polymer has a viscosity of 20 to 1,000 cps, as measured at 25° C.

4. The method of claim 1, wherein the alkyl acrylate-based polymer is added at 0.1 to 3 parts by weight with respect to 100 parts by weight of the total weight of monomers added in the method of preparing a graft copolymer.

5. The method of claim 1, wherein the alkyl acrylate-based polymer is one or more selected from the group consisting of poly(methyl acrylate), poly(ethyl acrylate), and poly(butyl acrylate).

6. The method of claim 1, wherein the core has an average particle diameter of 40 to 80 nm.

7. A graft copolymer comprising:
a seed including one or more selected from the group consisting of an alkyl (meth)acrylate-based monomer unit, an aromatic vinyl-based monomer unit, and a vinyl cyan-based monomer unit;
a core including the seed and an alkyl (meth)acrylate-based monomer unit;
a shell including the core, an aromatic vinyl-based monomer unit, and a vinyl cyan-based monomer unit; and
an alkyl acrylate-based polymer,
wherein the alkyl acrylate-based polymer is added to the graft copolymer after forming the shell and before performing coagulation.

8. The graft copolymer of claim 7, wherein the alkyl acrylate-based polymer has a weight-average molecular weight of 1,000 to 2,500 g/mol and a viscosity of 20 to 1,000 cps, as measured at 25° C.

9. The graft copolymer of claim 7, wherein the alkyl acrylate-based polymer is disposed in one or more regions of the shell and an interface between the core and the shell.

10. The graft copolymer of claim 7, wherein the core has an average particle diameter of 40 to 80 nm.

11. A thermoplastic resin molded article formed of a thermoplastic resin composition including: the graft copolymer of claim 7; and a matrix copolymer including an aromatic vinyl-based monomer unit and a vinyl cyan-based monomer unit, wherein the thermoplastic resin molded article has a weather resistance of 1.8 or less under SAE J1960 conditions for 6,000 hours and an impact strength of 13 kg·cm/cm or more according to ASTM 256.

12. A method of preparing a graft copolymer, comprising:
1) preparing a seed by adding one or more selected from the group consisting of an alkyl (meth)acrylate-based monomer, an aromatic vinyl-based monomer, and a vinyl cyan-based monomer and performing polymerization;
2) in the presence of the seed, preparing a core by adding an alkyl (meth)acrylate-based monomer and performing polymerization; and
3) in the presence of the core, preparing a shell by adding an aromatic vinyl-based monomer and a vinyl cyan-based monomer and performing polymerization,
wherein the method further includes adding an alkyl acrylate-based polymer, and
wherein the alkyl acrylate-based polymer has a weight-average molecular weight of 1,000 to 2,500 g/mol.

* * * * *